July 28, 1970 S. D. KAPELSOHN 3,521,875
ROTATABLE HANDLING DEVICE
Filed April 29, 1968 2 Sheets-Sheet 2

INVENTOR
SAMUEL D. KAPELSOHN
BY
Amster & Rothstein
ATTORNEYS

{ # United States Patent Office

3,521,875
Patented July 28, 1970

3,521,875
ROTATABLE HANDLING DEVICE
Samuel D. Kapelsohn, Mount Vernon, N.Y., assignor to Grand Iron Works, Inc., Bronx, N.Y., a corporation of New York
Filed Apr. 29, 1968, Ser. No. 724,897
Int. Cl. B23q 3/10
U.S. Cl. 269—58    12 Claims

ABSTRACT OF THE DISCLOSURE

The invention is concerned with apparatus for positioning elongated workpieces, principally structural members such as columns, I-beams or the like, to permit ready access to a work-face for purposes of fabrication. The inventive apparatus comprises one or more cylindrical positioner units adapted to receive a workpiece in coaxial extension and provided with clamping means disposed radially inward for engaging the workpiece at a position along its length. Generally, in utilizing the invention, two positioner units will be employed, suitably at the ends of the elongated workpiece, although more positioner units may be employed depending upon length and weight of the workpiece. The curved surfaces of the cylindrical positioner units are set upon rollers or wheels to permit rotary positioning of the clamped workpiece and locking means may be provided to hold a positioner unit during loading or to fix the rotary position of the workpiece during fabrication.

---

This invention relates to an apparatus for positioning an elongated workpiece and particularly, to an apparatus for supporting and securing a column or other structural member in coaxial extension. More particularly, the invention concerns a cylindrical apparatus for clamping an elongated workpiece in a coaxially extended position and rotating same to provide access to a desired work-face. The invention also concerns an assembly comprising a plurality of horizontal, axially aligned cylindrical positioner units for clamping and rotating an elongated workpiece.

In the fabrication of structural members, principally in the plants and yards of iron and steel fabricators, where the length and weight of such members dictate the use of materials handling equipment, an assortment of work aids are available. These aids include such old stand-bys as winches, cranes, pulleys, automatic lifts, hydraulic and screw jacks, and the like. There is no question as to the value of the role which such members play and continue to play in fabricating operations. Such diversified industries as plant construction, shipbuilding or railway car construction would be hard put to maintain modern work schedules without them. However, recent events have placed the fabricating industry in a new perspective and a need has arisen for a work aid which cannot be satisfied by the apparatus of the prior art. The unprecedented expansion of the economy and the modern trend toward "pre-fabs" has placed added emphasis on the fabricator's role. Time and motion studies of the welding and riveting trades in the light of increasing labor costs clearly indicate the need for specialized apparatus which can minimize "dead" time, i.e., the time during which no actual fabrication such as riveting or welding occurs but nevertheless is required to position a structural member and provide ready access to a workface. The need is particularly acute as regards elongated structural members, such as columns, I-beams and girders, where frequent lifting and re-positioning is required to permit a plurality of flanges, brackets, angles, braces and the like to be attached to different workfaces.

Accordingly, a principal object of the present invention is to provide an apparatus for positioning an elongated workpiece.

Another object of the invention is to provide an apparatus for supporting and rotating an elongated workpiece.

Figure 1:
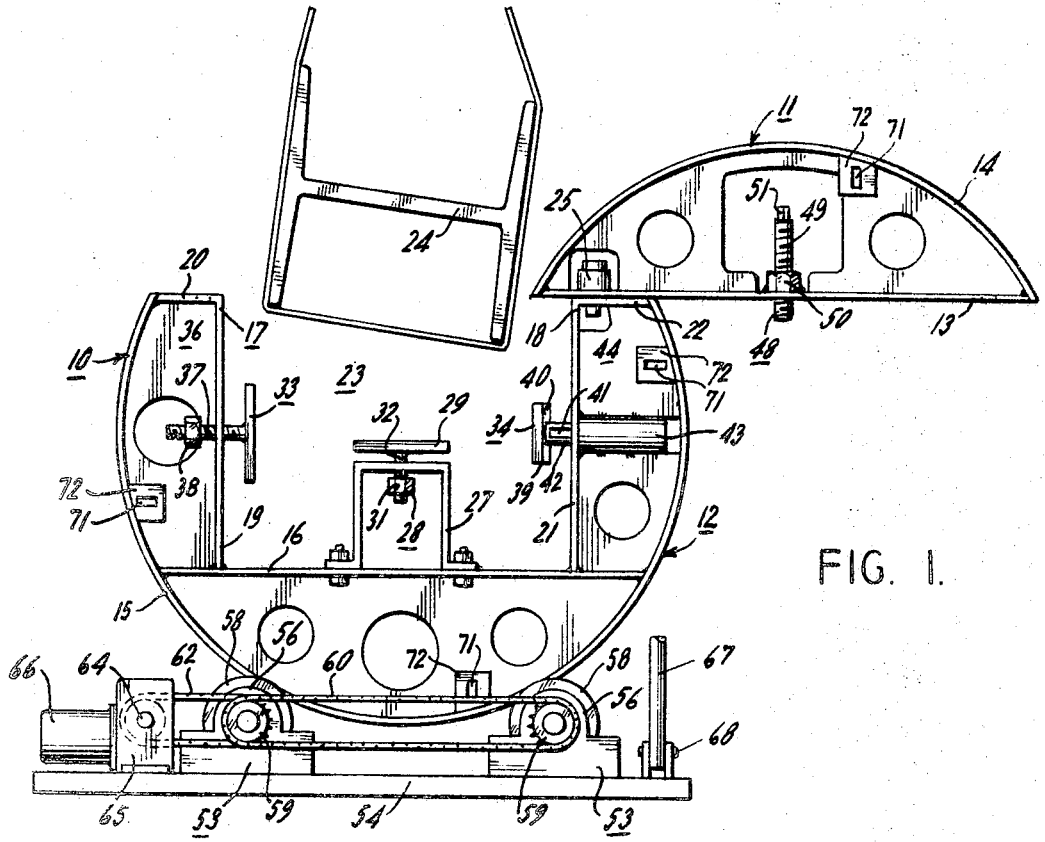
Figure 2:
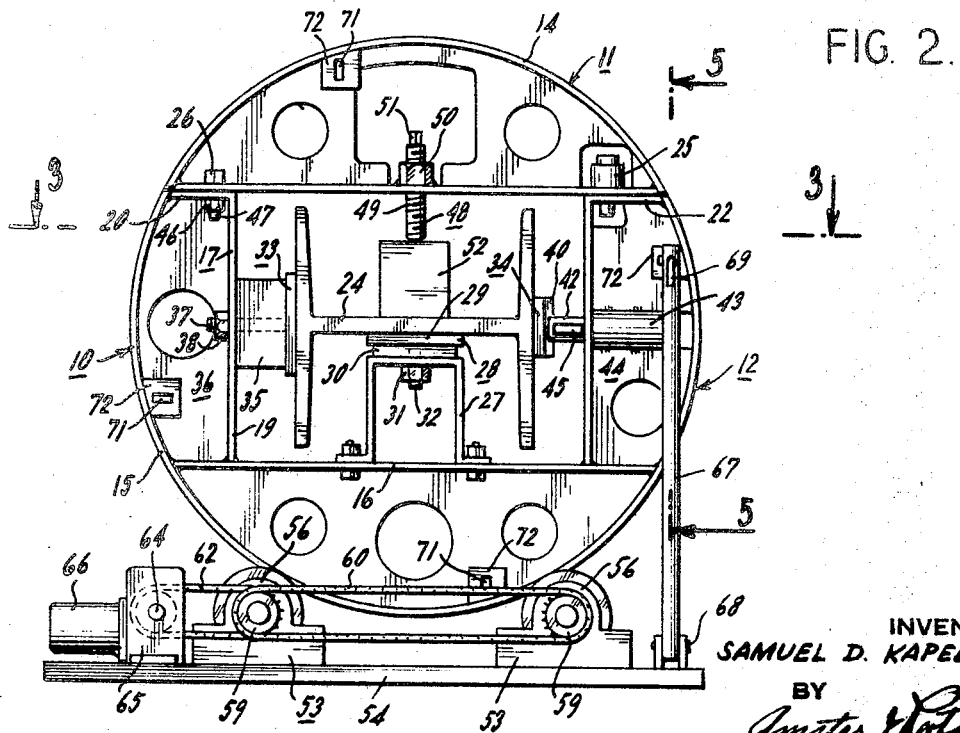
Figure 5:
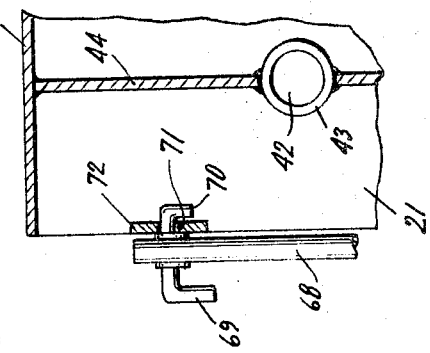
Figure 4:
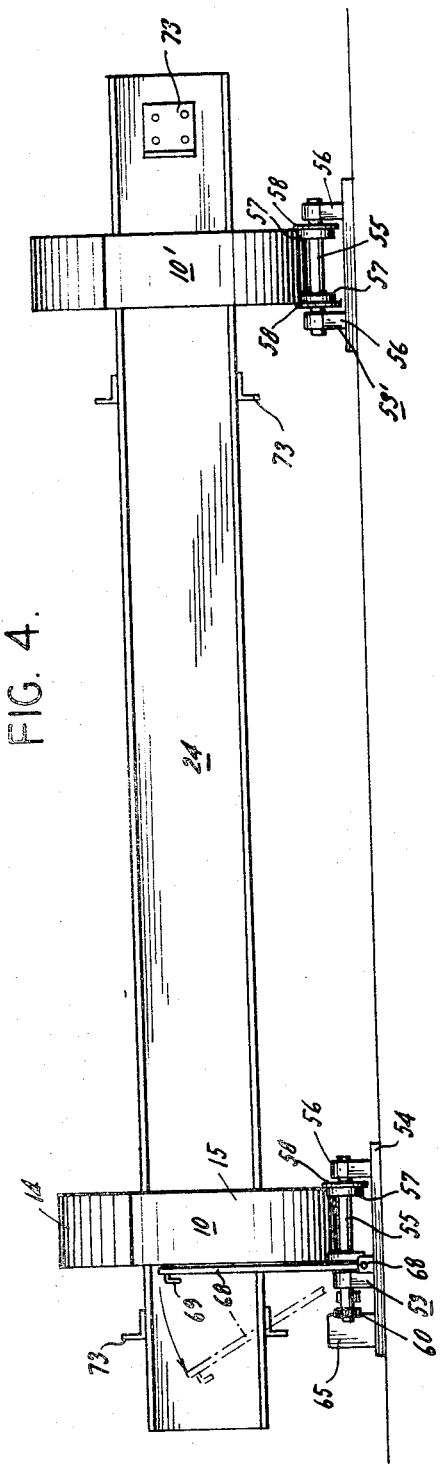
Figure 3:
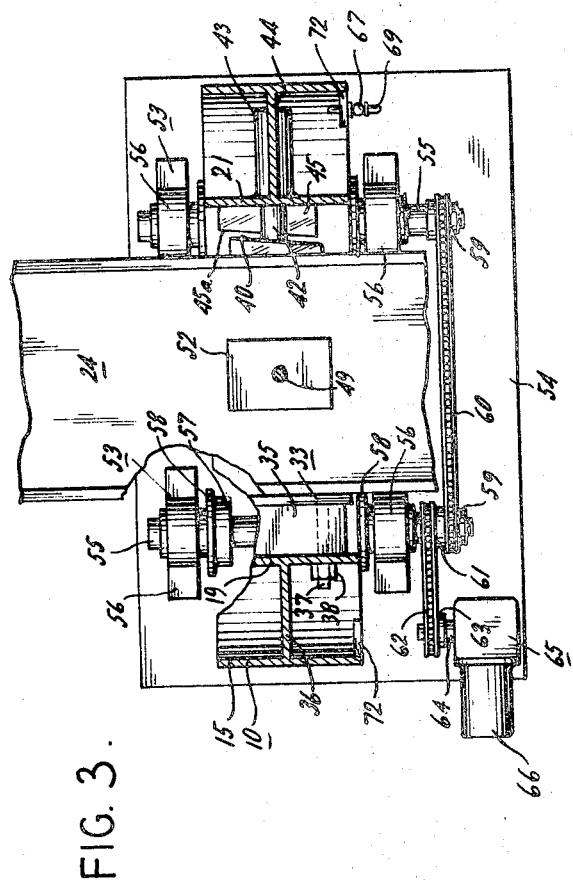

Other objects of the invention will in part be obvious and in part appear hereinafter in the following detailed description and accompanying drawings wherein FIG. 1 is an end view in elevation of the inventive apparatus in open position for receiving a workpiece in operative relationship, FIG. 2 is an end view in elevation of the inventive apparatus in closed position with a workpiece in operative relationship, FIG. 3 is a partially cut away sectional view of the inventive apparatus taken through line 3—3 of FIG. 2, FIG. 4 is a front view in elevation of a locked assembly comprising two inventive apparatuses and an elongated workpiece in operative relationship and indicating by phantom lines the motion of the locking bar to permit rotation of the workpiece, and FIG. 5 is an enlarged partial view in section of the locking mechanism of the inventive apparatus taken through line 5—5 of FIG. 2.

Referring more particularly to the drawings, wherein like reference numerals designate like elements throughout, it will be observed in FIGS. 1 and 2 that the inventive apparatus comprises a cylindrical positioner unit 10 having a gate section 11 removably joined to a bolster section 12. The gate section 11 is formed by a chord-like transverse member 13 and the arcuate wall 14 subtended thereby. The bolster section 12 is formed by the remaining arcuate wall 15, chord-like transverse member 16 and L-shaped members 17 and 18. Added strength and rigidity may be obtained by the provision of structural ribs between arcuate walls and subtending members, circular holes being cut therein to minimize weight. Chord-like transverse member 16 is parallel to transverse member 13 and separated therefrom by the pair of symmetrically positioned L-shaped members 17 and 18. L-shaped member 17 is joined to transverse member 16 by leg 19 perpendicular thereto and is joined to an end of the arcuate wall 15 by leg 20 parallel to transverse members 13 and 16. L-shaped member 18 is joined to transverse member 16 by leg 21 perpendicular thereto and is joined to the other end of arcuate wall 15 by leg 22 parallel to transverse members 13 and 16. The arrangement and construction is such that perpendicular legs 19 and 21 of L-shaped members 17 and 18, respectively, will bound the middle portion of transverse member 16 when the inventive apparatus is in the open position, as depicted in FIG. 1. The cross-sectional rectangular space or coaxial channel 23 defined by this arrangement and construction is adapted to receive an elongated workpiece, such as I-beam 24, in coaxial extension.

Insertion of I-beam 24 into coaxial channel 23 to provide an operative relationship is facilitated by provision of a pivotal connection 25 between gate section 11 and bolster section 12. Pivotal connection 25 is shown in FIGS. 1 and 2 joining one end of gate section transverse member 13 to parallel leg 22 of L-shaped member 18, while removable connection 26 is shown in FIG. 2 joining the other end of gate section transverse member 13 to parallel leg 20 of L-shaped member 17. Removal of connection 26 permits gate section 11 to be readily swung about pivotal connection 25 to open the inventive apparatus thereby permitting the elongated workpiece I-beam 24, to be lowered into coaxial channel 23 by means such as the strap shown in FIG. 1.

As the inventive apparatus is designed primarily for elongated workpieces comprising structural members and as the latter include those having a bosom-like cross-section, such as I-beam 24, a removable mount 27 projecting radially inward and adapted to fit into such bosom is provided on the middle of the bolster section transverse member 16. While mount 27 serves to some extent to guide I-beam 24 intermediate the walls of coaxial channel 23 formed by perpendicular legs 19 and 21, more importantly it takes up a major portion of the bosom height of the workpiece thereby minimizing the adjustment necessary to seat I-beam 24 on the radially adjustable means 28 supported by mount 27. Of course, where the workpiece has no bosom requiring mount 27, the latter may be removed and adjustable means 28 can be supported directly by bolster section transverse member 16. Radially adjustable means 28 may comprise any means effective to accomplish the desired purpose of seating and adjusting the radial position of I-beam 24. Suitably such means comprises a nut and bolt arrangement wherein the bolt head comprises a rectangular face plate 29, more clearly depicted in FIG. 3, for seating I-beam 24. Radial adjustment is effected by placing a shim 30 between the flat head 29 of the bolt and mount 27 and clamping shim 30 therebetween by tightening the nut 31 on the threaded end of the bolt shank 32. Conveniently, shim 30 may comprise a cylindrical block of wood of appropriate height with a coaxial hole drilled therein to accommodate the bolt shank 32.

Lateral positioning of I-beam 24 may be readily accomplished within the inventive apparatus by juxtaposed, radially adjustable means 33 and 34 mounted on perpendicular legs 19 and 21 respectively. One of the radially adjustable means designed for lateral positioning, e.g., radially adjustable means 33, may comprise a nut and bolt arrangement similar to that supported by mount 27 and functioning in a similar manner to effect clamping of shim 35. Modification is contemplated however, to accommodate a structural rib 36 midway between the lateral ends of parallel leg 19. This may be suitably accomplished, as shown in FIG. 3, by employing an eccentric bolt shank 37, clamping of shim 35 being effected by tightening nut 38 on the threaded end thereof. The other of the radially adjustable means designed for lateral positioning, i.e., radially adjustable means 34, as shown in FIGS. 1 and 2, suitably comprises a bolt 39 having a rectangular head with a tapered undersurface 40 and provided with a slot 41 extending along the longitudinal axis of the bolt shaft 42, the latter being slidably inserted into a pipe 43 which communicates with channel 23 and extends radially outward therefrom. Pipe 43 is rigidly affixed, e.g. welded, to perpendicular leg 21 and structural rib 44 as shown in FIG. 3. Radial adjustment of means 34 is effected by driving wedge 45 through slot 41 after I-beam 24 is seated on face plate 29 and coaxially aligned with cylindrical positioner unit 10 by appropriate adjustment of means 28 and means 33. As shown in FIG. 3 wedge 45 has a tapered side 45$_a$ which mates with the tapered undersurface 40 of bolt head 39.

After I-beam 24 is seated and laterally clamped as described, gate section 11 is closed, as shown in FIG. 2 and rigidly joined to bolster section 12 by removable connection 26, suitably comprising a nut and bolt arrangement. As depicted in FIG. 2, removable connection 26 consists of nut 46 tightened on the threaded end of bolt 47 inserted through mating holes in an end of gate section transverse member 13 and parallel leg 20 of L-shaped member 17.

Closing of gate section 11 places radial adjustable means 48 in juxtaposition with radial adjustable means 28. The former preferably comprises a screw shaft 49 threaded through a nut 50 fixedly attached, e.g., welded, to the middle of gate section transverse member 13. Conveniently, screw shaft 49 is provided on its radially outermost end 51 with a square cross-section to facilitate turning with a wrench. Radial adjustable means 48 is intended to be used in conjunction with block 52, suitably of wood, as shown in FIG. 2. Tightening of screw shaft 49 against block 52 completes the annular clamping of I-beam 24 and effectively secures same in coaxial extension.

Cylindrical positioner unit 10 is designed for use in combination with rotating means therefor. While the latter may comprise generally any means effective for the purpose of rotating positioner unit 10, a preferred embodiment is depicted in the drawings. It is observed in this embodiment that a pair of roller units 53 attached to a base 54 are employed to support and rotate positioner unit 10. Each roller unit 53 comprises a rotatable shaft 55 mounted at each end on journal boxes 56. Fixedly mounted on shaft 54 are a pair of spaced-apart wheels 57 having radially extended exterior sides forming flanges 58. The distance between wheels 57 is designed to accommodate positioner unit 10 in such manner that the peripheral edges of the latter nestle in the corners which flanges 58 form with wheels 57. Thus, clockwise rotation of shaft 55 and wheels 57 fixedly mounted thereon imparts counterclockwise rotation to positioner unit 10 and vice versa. The flanges 58 serve to restrict translational movement of positioner unit 10 and thus prevent unit 10 from falling off wheels 57 during rotation.

While it is contemplated that positioner unit 10 may be rotated manually while mounted on roller units 53, it is preferred, particularly in the case of heavy workpieces, that roller units 53 be power driven. An embodiment thereof shown in the drawings depicts a sprocket wheel 59 mounted on the same end of each shaft 55 of a pair of roller units 53 with a chain 60 joining them. One of the roller units has an additional sprocket wheel 61 which is joined by chain 62 to an external drive means. The latter is illustrated by sprocket wheel 63 mounted on a shaft 64, connected to a universal gear box 65. Shaft 66 leading from a motor (not shown) drives gear box 65. It is seen in this embodiment that both of the roller units 53 attached to base 54 are chain driven and rotate irrespective of their frictional contact with positioner 10. Thus, the embodiment presents a positive rotary driving means.

In general, the invention is designed for use as shown in FIG. 4 where I-beam 24 of a length and weight that would ordinarily require handling by a crane or other lifting apparatus is supported and secured by a positioner unit 10 near each of its ends. The embodiment of FIG. 4 depicts positioner unit 10 mounted on a power driven roller unit 53 while positioner unit 10' is mounted on an independent roller unit 53', the latter being rotated by frictional contact with the positioner unit mounted thereon.

For the purpose of locking positioner unit 10 and preventing rotation during loading or fabrication, locking means are provided. Such means may take the form, as shown in the drawings, of a locking bar 67 joined at one end to base 54 by pivotal connection 68 and having a locking handle 69 at the other end. The latter is provided with an L-shaped catch 70 adapted for insertion through slot 71 of locking plate 72. Rotation of handle 69 after insertion of catch 70 prevents withdrawal of the latter and effects a secure locking of the apparatus as shown in FIG. 5. While the apparatus may be locked in any desired rotational position merely by providing appropriately located locking plates, from the standpoint of efficiency, the employment of four locking plates spaced at uniform intervals about the perimeter of positioner unit 10 as shown in FIGS. 1 and 2 is a preferred embodiment. Where two positioner units are employed to support a workpiece, as in FIG. 3, it is only necessary to provide a single locking means, as shown, since locking of positioner unit 10 will prevent rotation of the entire assembly, including I-beam 24 and positioner unit 10'. In such locked position, a workman may readily attach structural members, such as brackets 73, without fear of rotational movement of the apparatus during fabrication. Where it is desired to rotate the apparatus to obtain better access to a desired workface on I-beam 24, the workman need merely unlock the apparatus by turning handle 69 to free catch 70 and moving locking bar 67 as shown in the phantom lines in FIG. 4.

While the invention has been described and disclosed in connection with specific embodiments thereof, it is expressly understood that the invention is not limited thereto but may be otherwise embodied or practiced within the scope of the appended claims.

What is claimed is:

1. An apparatus for positioning an elongated workpiece having a bosom-like cross-section comprising: a plurality of horizontal roller units; a plurality of horizontal, axially aligned, cylindrical positioner units, each of said positioner units being supported by at least two of said roller units and rotatable thereon and being adapted in operative relationship to circumscribe and annularly clamp said workpiece at a position along its length, said apparatus being so constructed and arranged that a rigid assemblage is formed by said plurality of positioner units and said workpiece in operative relationship, said rigid assemblage being rotatable as a unitary body on said plurality of roller units, each of said positioner units including a horizontal, hollow cylinder open at both ends to permit extension of a coaxially clamped workpiece, said cylinder having a gate section removably joined to a bolster section, said gate section being formed by a chord-like transverse member and the arcuate wall of the cylinder subtended thereby and said bolster section being formed by the remaining arcuate wall of the cylinder, a chord-like transverse member subtending a middle portion of said bolster section wall, said bolster section transverse member being parallel to said gate section transverse member and separated therefrom by a pair of symmetrically positioned, L-shaped, members, each of said L-shaped members being joined to said bolster section transverse member by a leg perpendicular thereto and being joined to an opposite end of the remaining arcuate wall of the cylinder by a leg parallel to said transverse members, the arrangement and construction being such that a coaxial channel is defined by the perpendicular legs of said L-shaped members and the portions of said transverse members intersected thereby, said channel being adapted to receive said workpiece in operative relationship.

2. An apparatus according to claim 1 wherein the perpendicular legs of said L-shaped members and the portions of the transverse members defining said coaxial channel are each provided with radially adjustable means for positioning and securing said workpiece.

3. An apparatus according to claim 2 including locking means for preventing rotation of said positioner units.

4. An apparatus according to claim 3 wherein the channel portion of said bolster transverse member is provided with a mount for said radially adjustable means projecting radially inward and adapted to fit into the bosom of said work piece thereby providing a guide for said workpiece.

5. An apparatus according to claim 4 wherein said gate section is joined to said bolster section by removable means connecting one end of the gate section transverse member to the parallel leg of one of the bolster section L-shaped members and pivotal means connecting the other end of the gate section transverse member to the parallel leg of the other of the bolster section L-shaped members, whereby the gate section may be readily removed to permit access of said workpiece to said coaxial channel and may be readily returned and re-connected to permit clamping of said workpiece.

6. An apparatus according to claim 5 wherein the radially adjustable means of said gate section transverse member comprises centrally located screw means adapted to bias said workpiece against the radially adjustable means mounted on said bolster transverse member.

7. An apparatus for positioning an elongated workpiece having a bosom-like cross-section comprising: a plurality of horizontal roller units, a plurality of horizontal, axially aligned, cylindrical positioner units, each of said positioner units being supported by at least two of said roller units and rotatable thereon and being adapted in operative relationship to circumscribe and annularly clamp said workpiece at a position along its length, said apparatus being so constructed and arranged that a rigid assemblage is formed by said plurality of positioner units and said workpiece in operative relationship, said rigid assemblage being rotatable as a unitary body on said plurality of roller units, each of said positioner units including a horizontal, hollow cylinder open at both ends to permit extension of a coaxially clamped workpiece, said cylinder having a gate section removably joined to a bolster section, said gate section being formed by a chord-like, generally transverse member and the arcuate wall of the cylinder subtended thereby and said bolster section being formed by the remaining arcuate wall of the cylinder, a chord-like transverse member subtending a portion thereof, said bolster section transverse member being parallel to said gate section transverse member and separated therefrom by a pair of symmetrically positioned members, each of said symmetrically positioned members being joined to said bolster section transverse member and to said gate section transverse member, the alignment and construction being such that a coaxial channel is defined by the symmetrically positioned members and the portions of said transverse members intersected thereby, said channel being adapted to receive said workpiece in operative relationship.

8. An apparatus according to claim 7 wherein said symmetrically positioned members and the portions of said transverse members defining said coaxial channel are each provided with radially adjustable means for positioning and securing said workpiece.

9. An apparatus according to claim 8 including locking means for preventing rotation of said positioner units.

10. An apparatus according to claim 9 wherein the channel portion of said bolster transverse member is provided with a mount for said radially adjustable means projecting radially inward and adapted to fit into the bosom of said workpiece, thereby providing a guide for said workpiece.

11. An apparatus according to claim 10 wherein said gate section is joined to said bolster section by removable means connecting one end of the gate section transverse member to one of said symmetrically positioned members and pivotal means connecting the other end of said gate section transverse member to the other of said symmetrically positioned members, whereby the gate section may be readily removed to permit access of said workpiece to said coaxial channel and may be readily returned and reconnected to permit clamping of said workpiece.

12. An apparatus according to claim 11 wherein the radially adjustable means of said gate section transverse member comprises generally, centrally located screw means adapted to bias said workpiece against the radially adjustable means mounted on said bolster transverse member.

References Cited

UNITED STATES PATENTS

| | | | |
|---|---|---|---|
| 914,299 | 3/1909 | McCarthy | 269—118 X |
| 2,277,631 | 3/1942 | Bullock | 269—58 |
| 2,768,597 | 10/1956 | Smith | 269—55 X |
| 3,069,153 | 12/1962 | Brown | 269—58 |
| 2,320,079 | 5/1943 | Hartwig | 269—287 X |

LESTER M. SWINGLE, Primary Examiner

U.S. Cl. X.R.

269—287